United States Patent [19]

Naito

[11] Patent Number: 5,168,953
[45] Date of Patent: Dec. 8, 1992

[54] DIFFERENTIAL LIMITING FORCE CONTROL SYSTEM AND METHOD FOR VEHICLE

[75] Inventor: Genpei Naito, Kanagawa Pref., Japan

[73] Assignee: Nissan Motor Co., Ltd., Yokohama City, Japan

[21] Appl. No.: 687,511

[22] Filed: Apr. 19, 1991

[30] Foreign Application Priority Data

Apr. 20, 1990 [JP] Japan .................. 2-104640

[51] Int. Cl.$^5$ ............................. B60K 23/04
[52] U.S. Cl. ..................... 180/197; 180/76; 364/426.03
[58] Field of Search .......... 180/76, 197, 248; 364/426.01, 426.03

[56] References Cited

U.S. PATENT DOCUMENTS

| 4,679,463 | 7/1987 | Ozaki et al. ............... 74/711 |
| 4,741,407 | 5/1988 | Torii et al. ............... 180/76 |
| 4,790,404 | 12/1988 | Naito ..................... 180/197 |
| 4,953,654 | 9/1990 | Imaseki et al. ............ 364/426.03 |
| 5,060,747 | 10/1991 | Eto ....................... 180/197 |
| 5,075,854 | 12/1991 | Imaseki et al. ............ 180/248 X |

FOREIGN PATENT DOCUMENTS

| 62-103227 | 5/1987 | Japan . |
| 207730 | 8/1988 | Japan .................. 180/248 |
| 312238 | 12/1988 | Japan .................. 180/248 |
| 4536 | 1/1989 | Japan .................. 180/248 |
| 4537 | 1/1989 | Japan .................. 180/248 |

Primary Examiner—Robert P. Olszewski
Assistant Examiner—Boris Milef
Attorney, Agent, or Firm—Foley & Lardner

[57] ABSTRACT

A control system for controlling a differential (or slip) limiting force of a limited slip differential of a vehicle comprises a sensor group for sensing a vehicle speed and a wheel speed difference between rotational speeds of left and right drive wheels, and a controller for controlling the differential limiting force by controlling a clutch engagement force of a differential limiting clutch. To improve both of a driving capability on a split friction road surface or a rough road and a vehicle stability in the high speed range, the controller increases the differential limiting force with increase in the wheel speed difference according to a preset control characteristic, and modifying the control characteristic between the differential limiting force and the wheel speed difference so that the differential limiting force tends to be lower when the vehicle speed becomes higher.

19 Claims, 5 Drawing Sheets

DIFFERENTIAL LIMITING FORCE CONTROL SYSTEM AND METHOD FOR VEHICLE

BACKGROUND OF THE INVENTION

The present invention relates to a control system for controlling a differential (slip) limiting force between left and right drive wheels of a vehicle.

A Japanese Patent Provisional Publication No. 62-103227 (Application No. 60-244677) shows one conventional example. A differential limiting force control system of this example is arranged to increase a rate of increase (control gain) of a differential limiting clutch engagement force as a left and right drive wheel speed difference increases to remedy a deficiency in the differential limiting force when the wheel speed difference is great.

However, this conventional control system is disadvantageous for the following reasons. When the control characteristic of the differential limiting force is preset to improve the driving capacity in starting vehicle on a split friction surface or with one drive wheel stuck in a mud, then the differential limiting force tends to be excessive in the high speed range. Therefore, the vehicle stability is poor especially when the vehicle is driven at a high speed on a split friction surface, and the tendency for understeering tendency is too strong especially when the vehicle enters a corner. When, on the other hand, the control characteristic is adapted to improve the stability in high speed driving on a split friction surface, then the driving ability in starting the vehicle on a split friction or rough road surface becomes poor.

SUMMARY OF THE INVENTION

It is an object of the present invention to provide a differential limiting force control system which can improve both the traction capacity of the vehicle and the stability and safety of high speed driving.

According to the present invention, a differential (or slip) limiting force control system for a vehicle, such as an automobile, comprises a differential means, a limiting clutch means, a sensor means, and a controller means.

The differential means is a means for dividing a driving torque, such as an engine torque produced by an engine of the vehicle, between left and right drive wheels of the vehicle, and permitting the left and right drive wheels to rotate at different speeds. The limiting clutch means is a means for limiting a differential action of the differential means with a clutch engagement force in accordance with a control signal.

The sensor means is a means for sensing one or more operating conditions of the vehicle. The sensor means comprises a wheel speed difference sensing means for determining a wheel speed difference which is a difference between a rotational speed of the left drive wheel and a rotational speed of the right drive wheel, and a vehicle speed sensing means for sensing a vehicle speed.

The controller means is a means for controlling the clutch engagement force of the clutch means by producing the control signal in accordance with sensor signals supplied from the sensor means. The controller means increases the clutch engagement force as the wheel speed difference increases, and decreases the clutch engagement force when the vehicle speed increases.

Preferably, the controller means includes a means for decreasing the clutch engagement force of the limiting clutch means by decreasing either or both of a rate of increase of the clutch engagement force with respect to the wheel speed difference and a maximum magnitude (or an upper limit) of the clutch engagement force.

In this way, the control system according to the present invention can improve both of the high speed stability and the low speed traction capacity by adjusting one or more parameters of the control characteristic.

DETAILED DESCRIPTION OF THE INVENTION

FIGS. 1A-4 shows one embodiment according to the present invention.

Figure 1A:
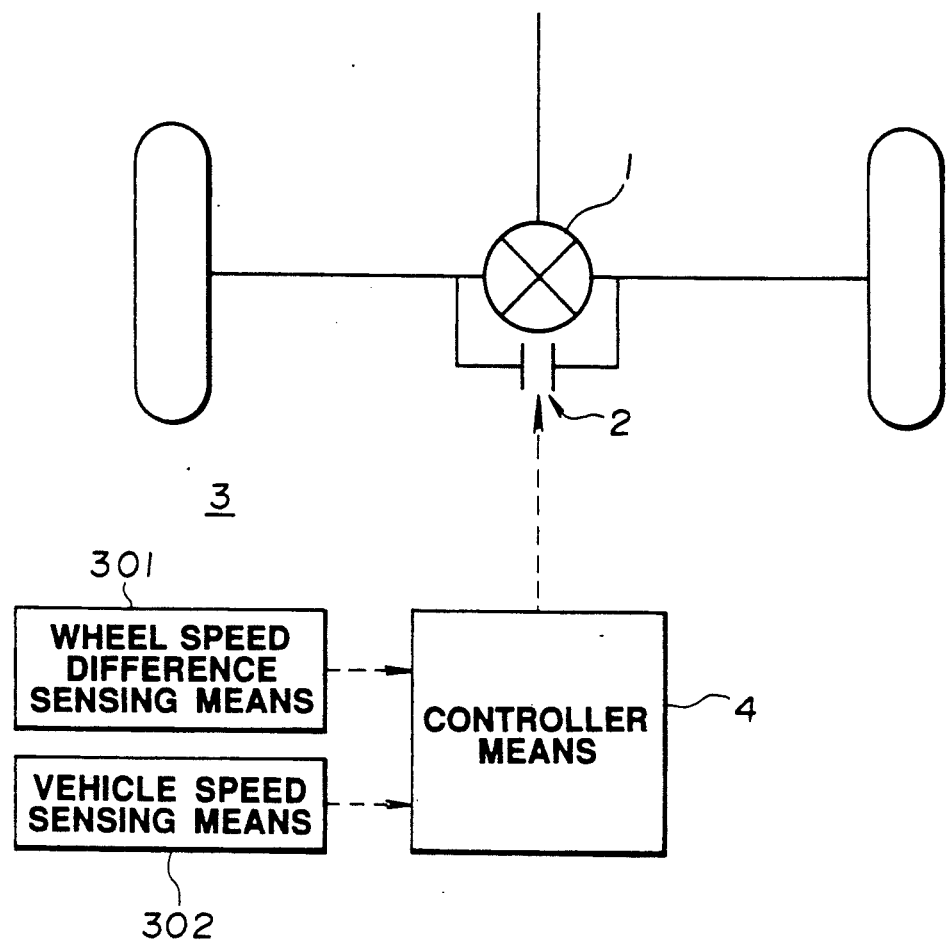
FIG. 1A is a schematic view showing a differential limiting force control system of one embodiment according to the present invention.
Figure 1B:
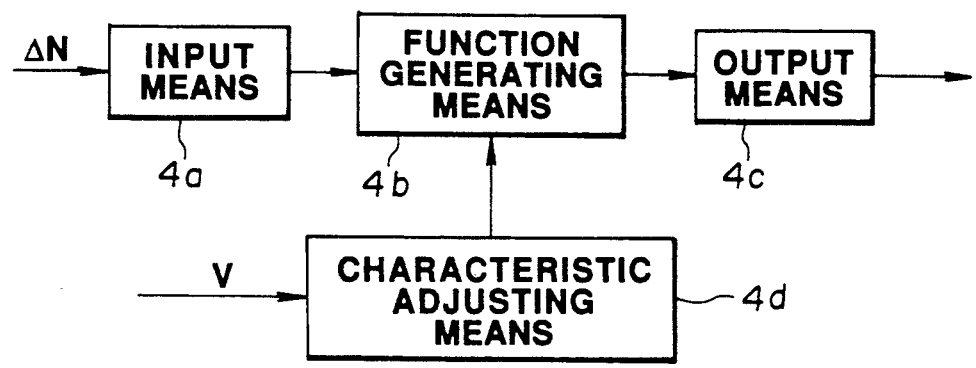
FIG. 1B is a block diagram showing various functional means contained in a controller means of the embodiment.

A system shown in FIG. 1A is a differential (or slip) limiting force control system for a vehicle such as an automobile. As shown in FIG. 1A, the differential limiting force control system of this embodiment includes at least four basic means each designed to perform a specific function. They are a differential means 1 for dividing a driving torque between left and right drive wheels of the vehicle and permitting both wheels to rotate at different speeds, a differential (slip) limiting clutch means 2 for limiting a differential action of the differential means 1, a sensor means 3 for sensing one or more operating conditions of the vehicle, and a controller means 4 for controlling a differential limiting force of the clutch means 2. The sensor means 3 comprises a wheel speed difference sensing means 301 and a vehicle speed sensing means 302. The controller means 4 receives sensor output signals from the sensor means 3, and delivers a control signal to the clutch means 2 to control the differential limiting force. As shown in FIG. 1B, the controller means 4 of this example comprises an input means 4a, a function generating means 4b, an output means 4c, and a characteristic adjusting means 4d. The input means 4a produces an input signal in response to the sensor signal sent from the wheel speed difference sensing means 301. The function generating means 4b receives the input signal from the input means 4a, and produces an output signal in response to the input signal. The output means 4c receives the output signal from the function generating means 4b and produces the control signal in response to the output signal of the function generating means 4b. The characteristic adjusting means 4d adjusts a characteristic relationship (or a transfer function) between the output and input signals of the function generating means in accordance with the vehicle speed so that the output signal is decreased when the vehicle speed increases.

Figure 2:
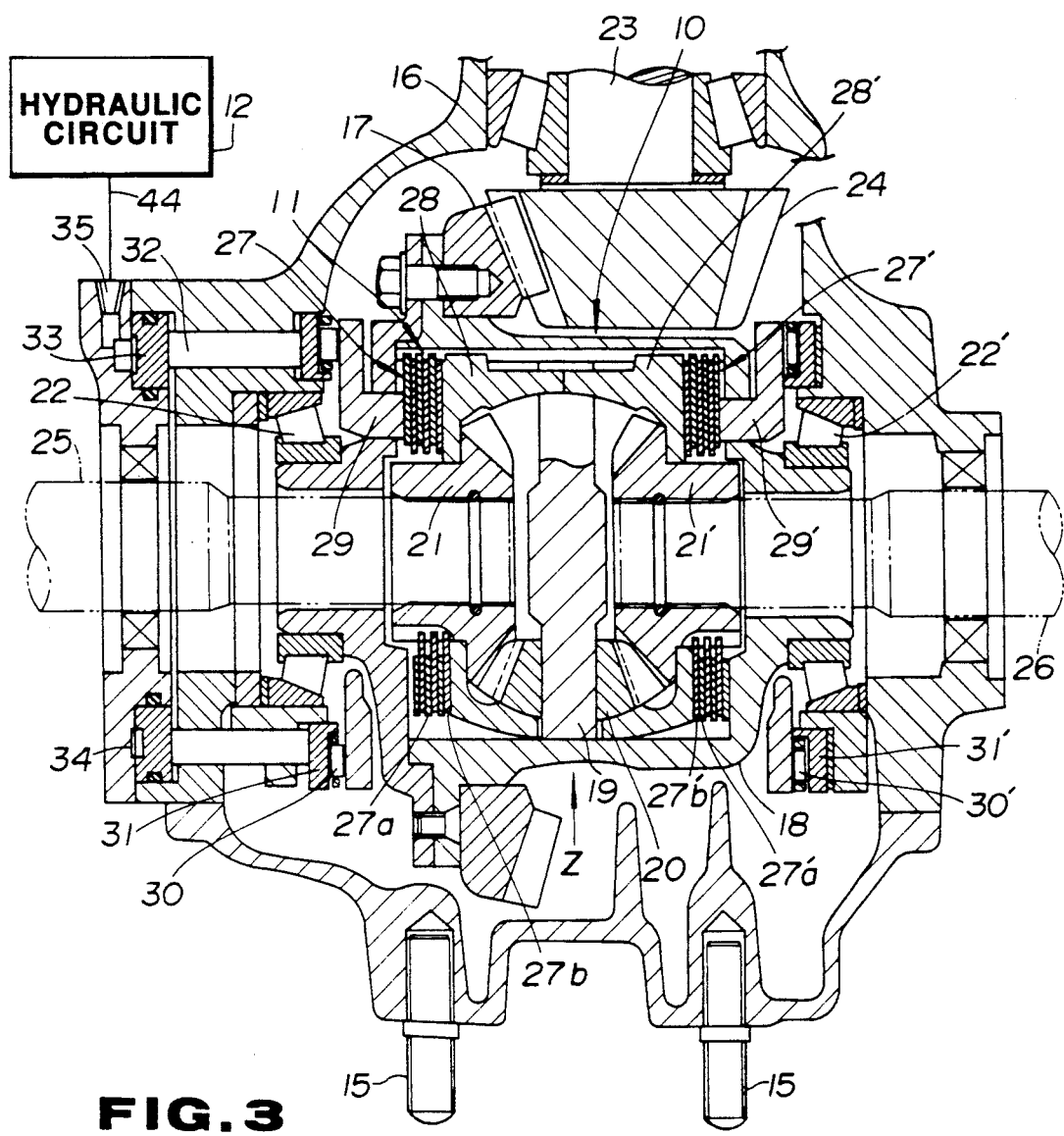
FIG. 2 is a sectional view of a differential gear mechanism employed in the embodiment.

In this embodiment, the differential means 1 comprises a differential gear mechanism 10 shown in FIG. 2. The differential limiting clutch means 2 comprises a differential limiting clutch system 11 operated by a hydraulic pressure supplied from a hydraulic circuit (system) 12. The controller means 4 comprises a control unit 13 shown in FIG. 4. The sensor means 3 comprises a sensor group 14 including various sensors for sensing operating conditions of the vehicle.

The differential gear mechanism 10 is a gear system designed to perform a differential function of permitting one of the left and right drive wheels to rotate faster than the other, and a torque distributing function of equally distributing engine power between the left and right drive wheels. The differential gear mechanism 10 has a housing 16 which is fixed to the vehicle body by stud bolts 15. The differential gear mechanism 10 further includes a ring gear 17, a differential case 18, a pinion mate shaft 19, at least one differential pinion 20, and left and right side gears 21 and 21'. These components are all rotating members, and they are enclosed in the housing 16.

The differential case 18 is rotatably supported on the housing 16 by tapered roller bearings 22 and 22'. The ring gear 17 is fixed to the differential case 18 so that the ring gear 17 and the case 18 rotate together. The ring gear 17 is in engagement with a drive pinion 24 provided in an end of a propeller shaft (or drive shaft) 23 of the vehicle. Therefore, engine torque is transmitted from the propeller shaft 23, through the drive pinion gear 24 and the ring gear 17, to the differential case 18.

The left and right side gears 21 and 21' are, respectively, connected with left and right axle shafts of the left and right drive wheels of the vehicle.

The differential limiting clutch system 11 is provided between a driving torque input side and a driving torque output side of the differential mechanism 10, and arranged to produce a differential limiting torque by receiving a hydraulic oil pressure. The clutch system 11 is disposed in the differential case 18. The clutch system 11 of this embodiment has left and right multiple disc friction clutches 27 and 27', pressure rings 28 and 28', reaction plates 29 and 29', thrust bearings 30 and 30', spacers 31 and 31', push rods 32, a pressure piston 33, a fluid chamber 34, and a pressure port 35.

Each of the friction clutches 27 and 27' has friction plates 27a or 27'a, and friction discs 27b or 27'b. The friction plates 27a and 27'a of both clutches are engaged with the differential case 18 (the torque input side) so as to prevent relative rotation therebetween. The friction discs 27b of the left clutch 27 are engaged with the left side gear 21 (the torque output side) so as to prevent relative rotation therebetween. The friction discs 27'b of the right clutch 27' are engaged with the right side gear 21' so as to prevent relative rotation therebetween. In each clutch, the friction plates and discs are alternately arranged, and the alternating pack of the friction plates and discs is sandwiched between the adjacent pressure ring (28 or 28') and reaction plate (29 or 29').

Figure 3:
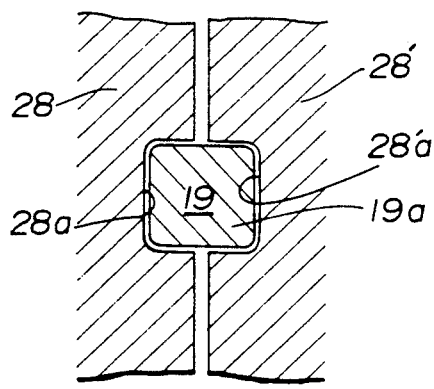
FIG. 3 is a view as viewed in a direction shown by an arrow Z in FIG. 2.

The pinion mate shaft 19 has end portions 19a each having a square cross sectional shape as shown in FIG. 3. Each square end portion 19a of the pinion mate shaft 19 is received in a square hole formed by confronting rectangular recesses 28a and 28'a of the left and right pressure rings 28 and 28'. This structure prevents occurrence of a thrust force due to a rotational wheel speed difference between the left and right wheels as in a torque proportional type differential limiting means. U.S. Pat. Nos. 4,741,407; 4,679,463 and 4,790,404 show similar differential gear mechanisms.

When the hydraulic pressure is supplied to the pressure port 35, the pressure piston 33 moves to the right as viewed in FIG. 2, in parallel to the axis of the side gears 21 and 21', and applies a force corresponding to the fluid pressure to engage the clutches 27 and 27'. A clutch engagement force is transmitted through the piston rods 32, the spacer 31 and the thrust bearing 30, to the reaction plate 29, so that the friction plates and discs 27a and 27b are compressed between the reaction plate 29 and the pressure ring 28. A reaction force is applied from the housing 16 to the right clutch 27'. Therefore, the friction plates and discs 27'a and 27'b are also engaged between the reaction plate 29' and the pressure ring 28'.

The hydraulic circuit (or fluid pressure source) 12 includes an oil pressure pump 40, a pump motor 41, a pump pressure passage 42, a drain passage 43, a control pressure passage 44 and an electromagnetic proportional pressure reducing valve 46 having a valve solenoid 45. The reducing valve 46 receives an output pressure of the pump 40 through the pump pressure passage 42, and produces a control pressure P which is proportional to the magnitude of a control current signal i supplied from the control unit 13. The control pressure P is supplied through the control pressure passage 44 and the pressure port 35, to the pressure chamber 34 of the differential limiting clutch system 11. In this way, the control unit 13 can control the clutch fluid pressure of the clutch system 11 by sending the control current signal i to the valve solenoid 45. A differential limiting force T produced by the limiting clutch system 11 is proportional to the control pressure P, as expressed by the following relationship.

$$T \propto P \cdot \mu \cdot n \cdot r \cdot A$$

where $\mu$ is a friction coefficient between the friction plates and discs, n is the number of the friction plates, r is an average radius of the clutch, and A is a pressure receiving area of the clutch. Therefore, the control unit 13 controls the differential limiting force T by varying the control pressure P.

The control unit 13 is made up of an onboard microcomputer and one or more peripheral equipments. In this embodiment, the control unit 13 includes an input interface circuit 131, a memory section 132, a central processing unit (CPU) 133, and an output interface circuit 134, as shown in FIG. 4.

Figure 4:
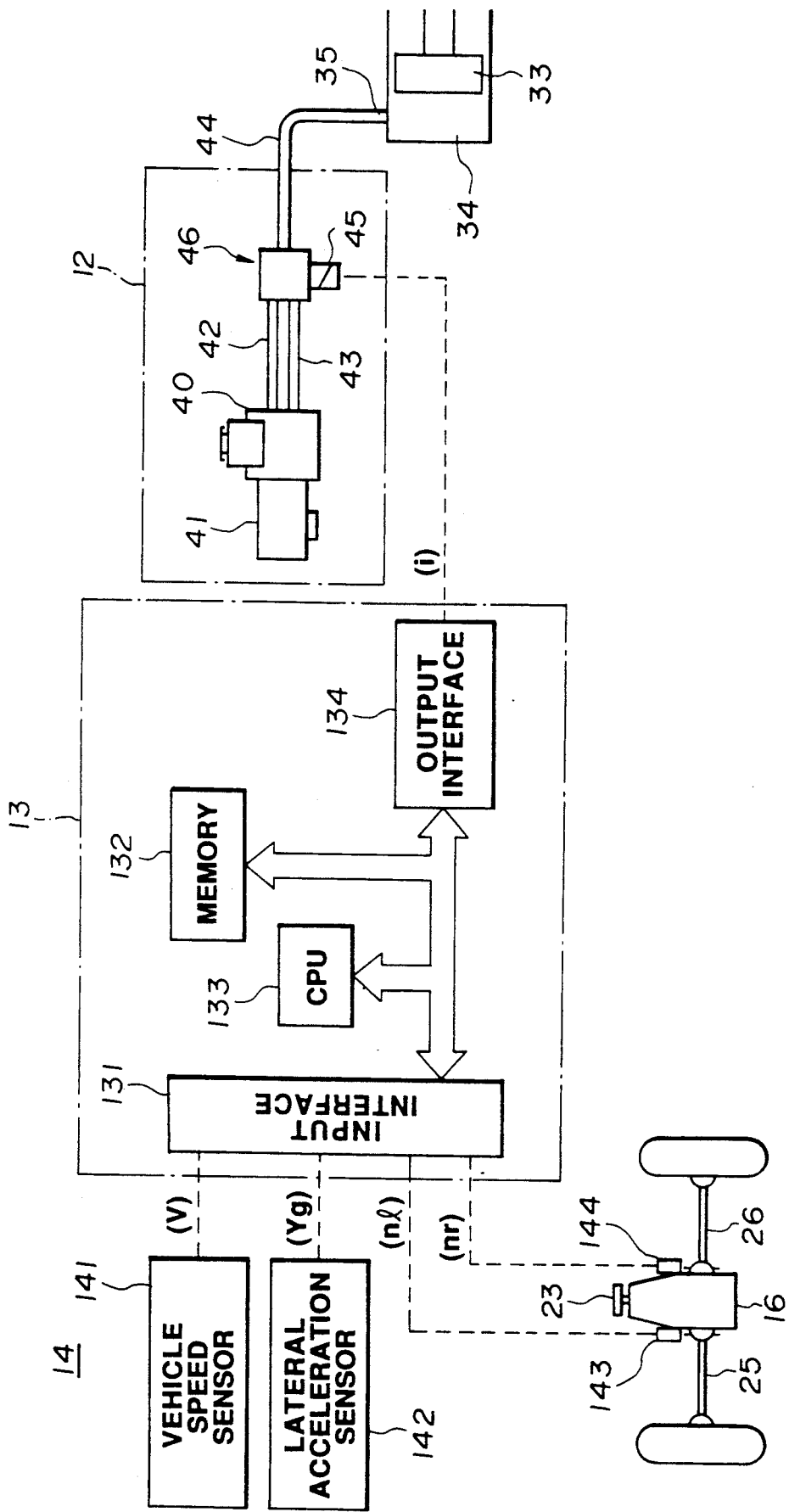
FIG. 4 is a schematic view showing sensors, a control unit and an actuator of the differential limiting control system of the embodiment.

The sensor group 14 of this embodiment includes a vehicle speed sensor 141, a lateral acceleration sensor 142, a left drive wheel speed speed sensor 143 and a right drive wheel speed sensor 144, as shown in FIG. 4.

The vehicle speed sensor 141 senses a vehicle speed V of the vehicle, and produces a sensor output signal representing the sensed vehicle speed V. The lateral acceleration sensor 142 senses a lateral acceleration Yg of the vehicle, and produces a sensor output signal representing the sensed lateral acceleration Yg. In this embodiment, the sensor means 3 further comprises a means for sensing a vehicle turning motion which comprises the lateral acceleration sensor 142. The left drive wheel speed sensor 143 senses a rotational speed nl of the left drive wheel of the vehicle, and produces a sensor output signal representing the sensed wheel speed nl. The right drive wheel speed sensor 144 senses a rotational speed nr of the right drive wheel of the vehicle, and produces a sensor output signal representing the sensed wheel speed nr.

Figure 5:
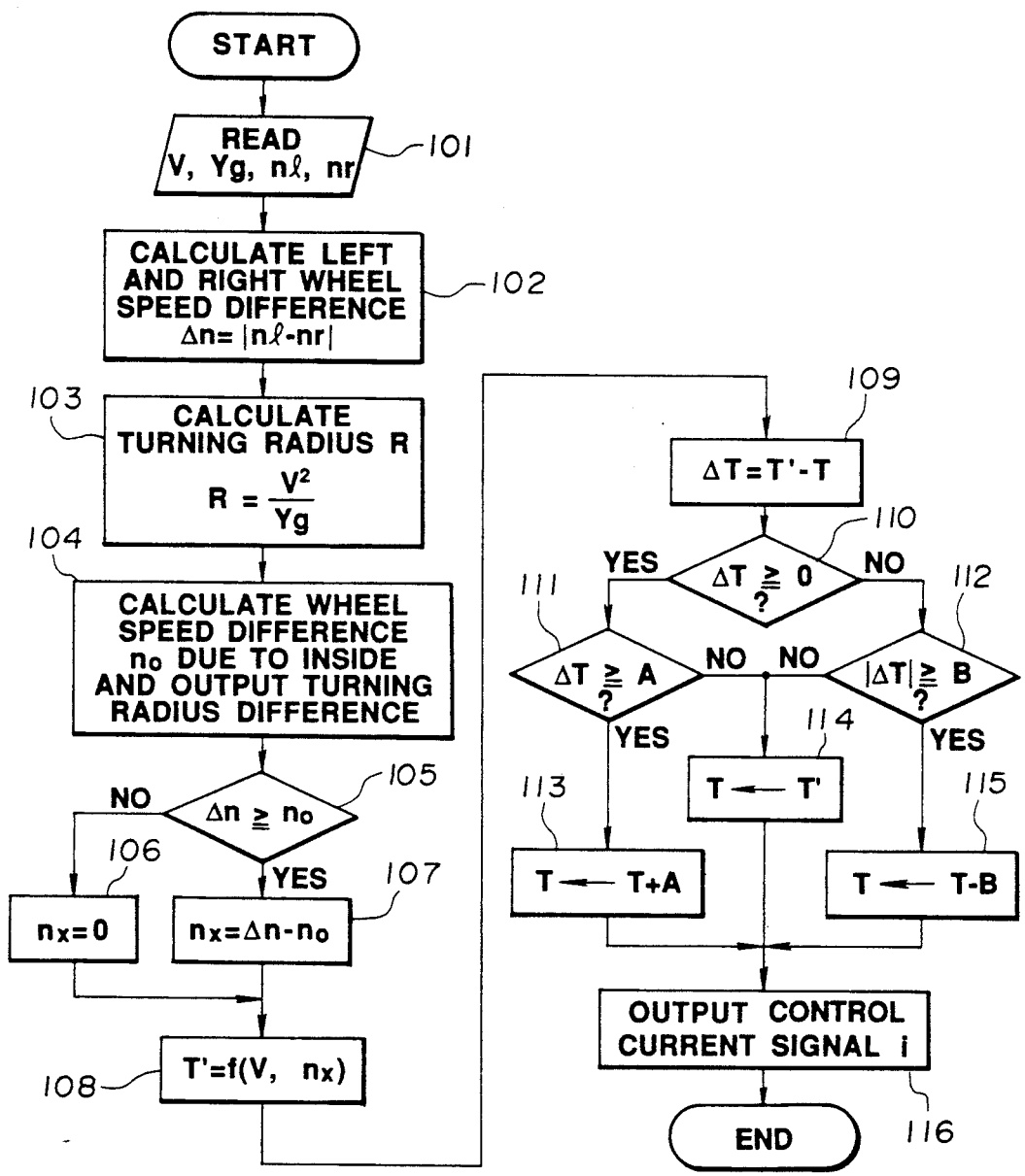
FIG. 5 is a flow chart showing a control procedure performed by the control unit shown in FIG. 4.

The control unit 13 of this embodiment controls the differential limiting force by periodically performing a control procedure shown in FIG. 5.

At a step 101, the control unit 13 reads current values of the vehicle speed V, the lateral acceleration Yg, and the left and right drive wheel speeds nl and nr.

At a step 102, the control unit 13 calculates a sensed left and right wheel speed difference $\Delta n$ which is equal to the magnitude (absolute value) of a difference between the sensed left and right wheel speeds nl and nr. That is, $\Delta n = |nl - nr|$.

At a step 103, the control unit 13 calculates a turning radius R from the sensed lateral acceleration Yg and the vehicle speed V by using the following equation. $R = V^2/Yg$.

At a step 104, the control unit 13 calculates a normal left and right wheel speed difference $n_0$ which is a left and right wheel speed difference due to a difference between a turning radius of the inside wheel and a turning radius of the outside wheel during a turn of the vehicle. The control unit 13 uses the following equation.

$$n_0 = f(R, V) = k \cdot \frac{V}{R}$$

In this equation, k is a constant determined by the make of the vehicle (i.e. the data of the specifications of the vehicle).

A program section consisting of steps 105–107 is designed to correct the sensed wheel speed difference $\Delta n$ by the normal difference $n_0$ in order to obtain a net wheel speed difference due to drive wheel slip. By removing the wheel speed difference $n_0$ due to the turning radius difference from the sensed wheel speed difference $\Delta n$, the control system of this embodiment can control the clutch engagement force T properly without suffering undesired influences of the tight corner braking especially when the vehicle is turned with a relatively large steering angle at a low vehicle speed.

The control unit 13 determines, at the step 105, whether the sensed wheel speed difference $\Delta n$ is equal to or greater than the normal speed difference $n_0$. If $\Delta n < n_0$, the control unit 13 proceeds from the step 105 to the step 106, and sets a controlled left and right wheel speed difference nx equal to 0 (nx=0). If $\Delta n \geq n_0$, the control unit 13 proceeds to the step 107, and sets the controlled left and right wheel speed difference nx equal to a difference resulting from subtraction of the normal difference $n_0$ from the sensed difference $\Delta n$ (nx = $\Delta n - n_0$).

Figure 6:
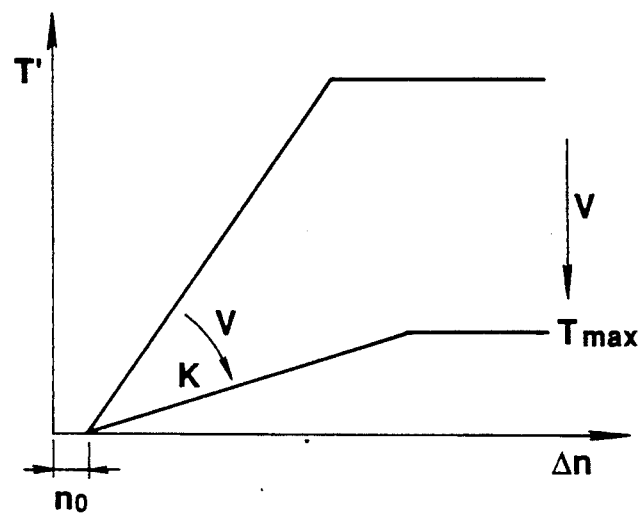
FIG. 6 is a graph showing a control characteristic of a desired clutch engagement force with respect to a left and right drive wheel speed difference, which is employed in the embodiment.
Figure 7:
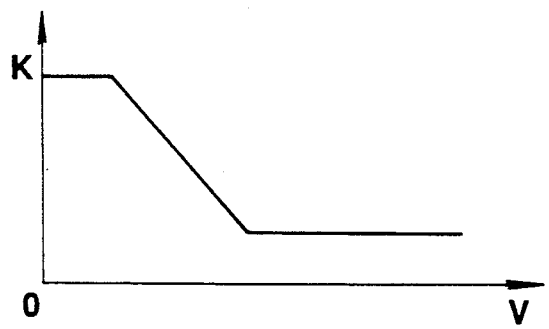
FIG. 7 is a graph showing a characteristic, employed in the embodiment, of a control gain with respect to a vehicle speed.
Figure 8:
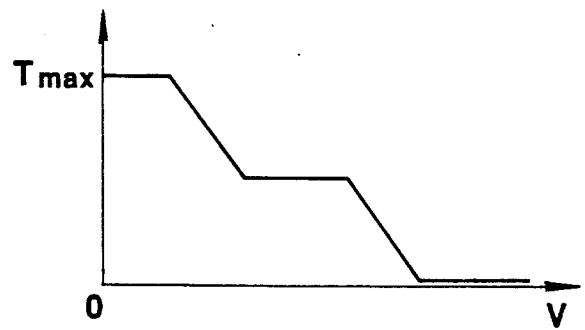
FIG. 8 is a graph showing a characteristic, employed in the embodiment, of a maximum magnitude of the desired clutch engagement with respect to the vehicle speed.

From the step 106 or 107, the control unit 13 proceeds to a step 108 to determine a desired clutch engagement force T' according to characteristics shown in FIGS. 6, 7 and 8. As shown in FIG. 6, the desired clutch engagement force T' increases continuously and monotonically as the controlled wheel speed difference nx increases from zero (or the sensed wheel difference $\Delta n$ increases beyond $n_0$). In FIG. 6, K is a control gain which is a rate of increase of the desired clutch engagement force T' with respect to the controlled wheel speed difference nx (or the sensed wheel speed difference $\Delta n$). The desired clutch engagement force T' of this example is a monotone nondecreasing function of the wheel speed difference. In this embodiment, the desired clutch engagement force T' is proportional to the controlled wheel speed difference nx, and the control gain K is a proportionality constant (or proportionality factor). As shown in FIG. 7, the control gain K is decreased as the vehicle speed V increases. In the characteristic shown in FIG. 7, the control gain K is equal to a highest rate value when the vehicle speed is smaller than a first speed value, and equal to a lowest rate value when the vehicle speed V is higher than a second speed value which is higher the first speed value. In the vehicle speed range between the first and second speed values, the control gain K is decreased linearly from the highest rate value to the lowest rate value as the vehicle speed increases from the first speed value to the second speed value. In this embodiment, the desired clutch engagement force T' is prevented from exceeding a maximum (or upper limit or saturation magnitude) Tmax, as shown in FIG. 6. The maximum Tmax is the maximum possible magnitude of the desired clutch engagement force T' that can be obtained as the sensed wheel speed difference $\Delta n$ is increased. In this embodiment, the control unit 13 adjusts not only the control gain K but also the maximum Tmax. The control unit 13 of this embodiment decreases the maximum Tmax as the vehicle speed V increases, as shown in FIG. 8. The maximum Tmax is equal to a highest limit value in a low vehicle speed range to a third speed value, equal to an intermediate limit value in a medium vehicle speed range from a fourth speed value to a fifth speed value, and equal to a lowest limit value in a high vehicle speed range above a sixth speed value. The maximum Tmax is decreased linearly from the highest limit value to the intermediate limit value along an inclined straight line segment shown in FIG. 8 as the vehicle speed V increases from the third speed value to the fourth speed value. Similarly, the maximum Tmax is decreased linearly from the intermediate limit value to the lowest limit value as the vehicle speed V increases from the fifth speed value to the sixth speed value. Especially in the high vehicle speed range in which the vehicle speed is equal to or higher than the predetermined sixth vehicle speed value, the maximum Tmax is held to the lowest limit value which is approximately equal to zero. In this way, the control unit 13 of this embodiment decreases the control gain K with increase in the vehicle speed so that the inclined straight line of the control characteristic of the desired clutch engagement force T' with respect to the wheel speed difference $\Delta n$ is made more gradual with increase in the vehicle speed, as shown in FIG. 6. Moreover, the control unit 13 of this embodiment decreases the maximum possible magnitude Tmax of the desired clutch engagement force T' as the vehicle speed V increases.

The step 108 corresponds to the function generating means 4b and the characteristic adjusting means 4d show in FIG. 1B.

The control system of this embodiment is arranged to adjust both the control gain K and the maximum Tmax.

However, it is optional to adjust either of the control gain K and the maximum Tmax. In any case, the control system according to the invention decreases the desired clutch engagement force at least in a limited range of the sensed wheel speed difference Δn when the vehicle speed increases, or modifies at least a portion of the control characteristic between T' and Δn so as to decrease the desired clutch engagement force T' when the vehicle speed V increases.

In this way, the control unit 13 determines values of the control gain K and the maximum magnitude Tmax corresponding to the current value of the vehicle speed V, and determines a value of the desired clutch engagement force T' corresponding to the current value of the controlled left and right wheel speed difference nx by using the control characteristic between T' and nx that is specified by the values of the control gain K and the maximum magnitude Tmax.

A program section of steps 109–115 is a filtering section for preventing an abrupt change of a command clutch engagement force T to be represented by the control signal. At the step 109, the control unit 13 calculates a difference ΔT resulting from subtraction from the current value of the desired clutch engagement force T', of a previous value of the command clutch engagement force T which was determined in the last control cycle. That is, ΔT=T'−T. At the step 110, the control unit 13 checks the sign of the amount of change ΔT of the clutch engagement force per control cycle, and determines whether the clutch engagement force is increasing or decreasing.

If ΔT≧0, then the control unit 13 determines, at the step 111, whether the amount of change ΔT is equal to or greater than a first predetermined value A. Then, the control unit 13 proceeds to the step 113 to prevent an abrupt increase of the clutch engagement force if ΔT≧A, and proceeds to the step 114 if ΔT<A.

If ΔT is smaller than zero, then the control unit 13 proceeds from the step 110 to the step 112, and determines whether the magnitude (absolute value) of ΔT is equal to or greater than a second predetermined value B. If |ΔT|≧B, the control unit 13 proceeds to the step 115 to prevent an abrupt decrease of the clutch engagement force. If |ΔT|<B, the control unit 13 proceeds to the step 114.

At the step 113, the control unit 13 sets the command clutch engagement force T equal to a sum of the previous value of the command clutch engagement force T and the maximum allowable amount of increase A in order to restrict the amount of increase of the clutch engagement force. That is, T←T+A.

At the step 114, the control unit 13 sets the command clutch engagement force T equal to the current value of the desired clutch engagement force T' because the amount of increase or decrease of the clutch engagement force is in an allowable range. That is, T←T'.

At the step 115, the control unit 13 sets the command clutch engagement force T equal to a difference between the previous value of the command clutch engagement force T and the maximum allowable amount of decrease B, to restrict the amount of decrease of the clutch engagement force. That is, T←T−B.

At a step 116, the control unit 13 delivers a control current signal i representing the command clutch engagement force determined at one of the steps 113, 114 and 115, to the valve solenoid 45 of the electromagnetic proportional type pressure reducing valve 46. Therefore, the hydraulic circuit 12 produces the control hydraulic pressure P which can produce an actual clutch engagement force substantially equal to the command clutch engagement force T represented by the control signal i.

The thus-constructed differential limiting force control system of this embodiment can provide superior driving performances as follows:

(A) At low vehicle speeds:

As shown in FIGS. 7 and 8, the control system of this embodiment employs higher values of the control gain K and the maximum magnitude Tmax of the desired clutch engagement force T' at low vehicle speeds especially when the vehicle is started on a split friction (split $\mu$) surface or when one wheel is stuck. By so doing, the control system increases the differential (slip) limiting force steeply up to a high level with increase in the left and right wheel speed difference due to drive wheel slippage. As a result, the control system can improve the driving or traction capacity of the vehicle.

When the vehicle is turned with a large steering angle in the low vehicle speed range, the control system also determines the desired clutch engagement force T' according to the control characteristic having a high control gain value. However, the control system of this embodiment can prevent the undesired phenomena known as tight corner braking by using the control wheel speed difference obtained by subtraction from the sensed left and right drive wheel speed difference Δn, of the wheel speed difference $n_0$ due to the difference between inside and outside turning circles traveled by the inside and outside wheels.

(B) At high vehicle speeds:

When the vehicle is driven at a high speed on a split friction surface, the control system determines the desired clutch engagement force T' by using the control characteristic which is so specified that the control gain K is low as shown in FIG. 7, and the maximum magnitude Tmax is also low as shown in FIG. 8. Therefore, the control system can prevent rear end swing of the vehicle by avoiding excess of the differential limiting force, and thereby improve the vehicle stability and safety.

When the vehicle is turned in the high vehicle speed range, the control system also determines the desired clutch engagement force T' by using the control characteristic having a low control gain value. Therefore, the control system can prevent an understeering tendency in the handling characteristic, and a degradation in the vehicle steering response of yawing motion by preventing the differential limiting force from becoming too high when the vehicle enters a corner.

In this way, the control system of the invention is designed to modify the control characteristic so that the differential limiting force tends to be lower when the vehicle speed is high. Therefore, the control system can attain improvements in both the traction capacity in the low speed range and the vehicle stability in the high vehicle speed range which have been deemed to be incompatible. Moreover, the control system of the invention can improve the yaw steering response by preventing understeering tendency at an initial stage of a high speed cornering operation. When the control wheel speed difference corrected by the left and right wheel speed difference due to the inside and outside turning path difference is employed, the control system can sufficiently prevent the tight corner braking.

According to the present invention, the control system may be arranged to adjust only either one of the control gain K and the maximum magnitude Tmax. Furthermore, the control system according to the present invention can employ any of various ways for varying the clutch engagement force. For example, the present invention can employ a duty factor control system including an electromagnetic valve for opening and closing a fluid passage, and a circuit for producing a periodic pulse signal having a controlled duty factor (or duty cycle) to actuate the valve. Alternatively, the present invention can employ an electromagnetic clutch.

What is claimed is:

1. A differential limiting force control system for a vehicle, comprising:
   a differential means for distributing a driving torque between left and right drive wheels of the vehicle, and permitting both wheels to rotate at different speeds;
   a clutch means for limiting a differential action of said differential means with a clutch engagement force in accordance with a control signal;
   a sensor means for sensing an operating condition of the vehicle, said sensor means comprising a wheel speed difference sensing means for determining a wheel speed difference which is a difference between a rotational speed of the left drive wheel and a rotational speed of the right drive wheel, and a vehicle speed sensing means for determining a vehicle speed of the vehicle; and
   a controller means for controlling the clutch engagement force of said clutch means by producing said control signal in accordance with signals supplied from said sensor means, said controller means increasing the clutch engagement force as the wheel speed difference increases, and decreasing one of an increasing rate of said clutch engagement force and a maximum magnitude of the clutch engagement force when the vehicle speed increases, said increasing rate being a rate of increase of the clutch engagement force with respect to the wheel speed difference, and said maximum magnitude being an upper limit of the clutch engagement force.

2. A control system according to claim 1 wherein said controller means includes a means for increasing the clutch engagement force of said clutch means at a preset rate of increase with respect to the wheel speed difference up to a preset upper limit so that the clutch engagement force is substantially linear with respect to the wheel speed difference up to the upper limit, and presetting at least one of the rate of increase of the clutch engagement force and the upper limit of the clutch engagement force in accordance with the vehicle speed so that at least one of the rate of increase and the upper limit is decreased when the vehicle speed increases.

3. A control system according to claim 1 wherein said controller means comprises an input means for producing an input signal in accordance with the wheel speed difference sensed by said wheel speed difference sensing means, a function generating means for receiving the input signal and producing an output signal representing a desired clutch engagement force in accordance with the input signal, and output means for producing the control signal in accordance with the output signal of said function generating means, and a characteristic adjusting means for adjusting a characteristic relationship between the output and input signals of said function generating means in accordance with the vehicle speed so that the desired clutch engagement force is decreased when said vehicle speed increases.

4. A control system according to claim 3 wherein said function generating means includes a means for generating the output signal in accordance with the input signal so that the output signal is a monotone nondecreasing function of the input signal, and said characteristic adjusting means includes a means for adjusting said nondecreasing function so as to decrease a value of said output signal corresponding to a predetermined value of said input signal when said vehicle speed increases.

5. A control system according to claim 4 wherein said function generating means includes a means for generating the output signal in accordance with the input signal so that the output signal is increased linearly with increase in the input signal at a preset rate of increase until an upper limit is reached by the output signal, and said characteristic adjusting means includes a means for decreasing one of the rate of increase and the upper limit which are used by said function generating means when the vehicle speed increases.

6. A control system according to claim 5 wherein said input means includes a means for determining a normal left and right wheel speed difference which is a left and right wheel speed difference due to a difference between turning radii of inside and outside wheels during a turn of the vehicle; further determining a controlled wheel speed difference which is equal to zero when a sensed wheel speed difference sensed by said wheel speed difference sensing means is smaller than the normal wheel speed difference and which is equal to a difference obtained by subtracting the normal wheel speed difference from the sensed wheel speed difference when the sensed wheel speed difference is greater than the normal wheel speed difference; and producing the input signal representing the controlled wheel speed difference.

7. A control system according to claim 6 wherein said function generating means includes a means for determining the desired clutch engagement force which is proportional to the controlled wheel speed difference.

8. A control system according to claim 1 wherein said differential means comprises a differential gear mechanism comprising a differential case, and left and right side gears, and said clutch means comprises a left clutch disposed between said differential case and said left side gear, and a right clutch disposed between said differential case and said right side gear.

9. A control system according to claim 8 wherein said clutch means further comprises a solenoid valve for varying a hydraulic fluid pressure for operating said left and right clutches in response to said control signal.

10. A control system according to claim 1, wherein said controller means comprises an input means for determining a normal wheel speed difference, which is a left and right wheel speed difference due to a difference between turning radii of inside and outside wheels during a turn of the vehicle, in accordance with said vehicle speed sensed by said vehicle speed sensing means, and for further determining a controlled wheel speed difference which is a difference resulting from subtraction of said normal wheel speed difference from a sensed wheel speed difference sensed by said wheel speed difference sensing means; a function generating means for increasing the clutch engagement force according to a control characteristic of the clutch engagement force with respect to said controlled wheel speed difference only when said controlled wheel speed difference is positive; and a characteristic adjusting means for adjusting said control characteristic in accordance with said vehicle speed so as to decrease the clutch engagement force with increase in the vehicle speed.

11. A control system according to claim 10, wherein said sensor means further comprises a third sensing means for sensing a turning condition of the vehicle, and said input means of said controller means includes a means for determining said normal wheel speed difference in accordance with said vehicle speed and a signal supplied from said third sensing means.

12. A control method for controlling a clutch engagement force of a differential limiting clutch for limiting a differential action of a differential mechanism between left and right drive wheels of a vehicle, comprising the steps of:
   a) obtaining a sensed vehicle speed, and sensed rotational speeds of the left and right drive wheels of the vehicle;
   b) determining an actual left and right wheel speed difference from said sensed rotational speeds of said left and right drive wheels;
   c) determining a normal left and right wheel speed difference which is a left and right wheel speed difference due to a difference between turning radii of inside and outside wheels during a turn of the vehicle;
   d) comparing said actual wheel speed difference with said normal wheel speed difference;
   e) holding the clutch engagement force at a low level to ensure a smooth cornering operation of the vehicle when said actual wheel speed difference is lower than said normal wheel speed difference; and
   f) increasing the clutch engagement force with increase in said actual wheel speed difference when said actual wheel speed difference is greater than said normal wheel speed difference, and decreasing one of an increasing rate of the clutch engagement force and a maximum magnitude of the clutch engagement force when the vehicle speed increases, said increasing rate being a rate of increase of the clutch engagement force with respect to the actual wheel speed difference, said maximum magnitude being an upper limit of the clutch engagement force.

13. A control method according to claim 12, wherein said normal wheel speed difference is determined in accordance with said vehicle speed and a sensed turning condition of the vehicle.

14. A differential limiting force control system for a vehicle, comprising:
   a differential means for distributing a driving torque between left and right drive wheels of the vehicle, and permitting both wheels to rotate at different speeds;
   a clutch means for limiting a differential action of said differential means with a clutch engagement force in accordance with a control signal;
   a sensor means for sensing an operating condition of the vehicle, said sensor means comprising a wheel speed difference sensing means for determining a wheel speed difference which is a difference between a rotational speed of the left drive wheel and a rotational speed of the right drive wheel, and a vehicle speed sensing means for determining a vehicle speed of the vehicle; and
   a controller means for controlling the clutch engagement force of said clutch means by producing said control signal in accordance with signals supplied from said sensor means, said controller means increasing the clutch engagement force as the wheel speed difference increases, and decreasing one of an increasing rate of said clutch engagement force and a maximum magnitude of the clutch engagement force when the vehicle speed increases, said increasing rate being a rate of increase of the clutch engagement force with respect to the wheel speed difference, and said maximum magnitude being an upper limit of the clutch engagement force;
   wherein said controller means includes a means for increasing the clutch engagement force with increase in the wheel difference according to a control characteristic which is a relationship between the clutch engagement force and the wheel speed difference, and adjusting said control characteristic in accordance with the vehicle speed so as to decrease the clutch engagement force with increase in the vehicle speed;
   wherein said controller means comprises an input means for producing an input signal in accordance with the wheel speed difference sensed by said wheel speed difference sensing means, a function generating means for receiving the input signal and producing an output signal representing a desired clutch engagement force in accordance with the input signal, an output means for producing the control signal in accordance with the output signal of said function generating means, and a characteristic adjusting means for adjusting a characteristic relationship between the output and input signals of said function generating means in accordance with the vehicle speed so that the desired clutch engagement force is decreased when said vehicle speed increases;
   wherein said function generating means includes a means for generating the output signal in accordance with the input signal so that the output signal is a monotone nondecreasing function of the input signal, and said characteristic adjusting means includes a means for adjusting said nondecreasing function so as to decrease a value of said output signal corresponding to a predetermined value of said input signal when said vehicle speed increases;
   wherein said function generating means includes a means for generating the output signal in accordance with the input signal so that the output signal is increased linearly with increase in the input signal at a preset rate of increase until an upper limit is reached by the output signal, and said characteristic adjusting means includes a means for decreasing one of the rate of increase and the upper limit which are used by said function generating means when the vehicle speed increases;
   wherein said input means includes a means for determining a normal left and right wheel speed difference which is a left and right wheel speed difference due to a difference between turning radii of inside and outside wheels during a turn of the vehicle; further determining a controlled wheel speed difference which is equal to zero when a sensed wheel speed difference sensed by said wheel speed difference sensing means is smaller than the normal wheel speed difference and which is equal to a difference from the sensed wheel speed difference when the sensed wheel speed difference is greater than the normal wheel speed difference; and producing the input signal representing the controlled wheel speed difference;

wherein said output means includes a means for limiting an amount of change of the control signal during a predetermined time period.

15. A differential limiting force control system for a vehicle, comprising:

a differential means for distributing a driving torque between left and right drive wheels of the vehicle, and permitting both wheels to rotate at different speeds;

a clutch means for limiting a differential action of said differential means with a clutch engagement force in accordance with a control signal;

a sensor means for sensing an operating condition of the vehicle, said sensor means comprising a wheel speed difference sensing means for determining a wheel speed difference which is a difference between a rotational speed of the left drive wheel and a rotational speed of the right drive wheel, and a vehicle speed sensing means for determining a vehicle speed of the vehicle; and a controller means for controlling the clutch engagement force of said clutch means by producing said control signal in accordance with signals supplied from said sensor means, said controller means increasing the clutch engagement force as the wheel speed difference increases, and decreasing one of an increasing rate of said clutch engagement force and a maximum magnitude of the clutch engagement force when the vehicle speed increases, said increasing rate being a rate of increase of the clutch engagement force with respect to the wheel speed difference, and said maximum magnitude being an upper limit of the clutch engagement force;

wherein said controller means includes a means for increasing the clutch engagement force with increase in the wheel difference according to a control characteristic which is a relationship between the clutch engagement force and the wheel speed difference, and adjusting said control characteristic in accordance with the vehicle speed so as to decrease the clutch engagement force with increase in the vehicle speed;

wherein said controller means comprises an input means for producing an input signal in accordance with the wheel speed difference sensed by said wheel speed difference sensing means, a function generating means for receiving the input signal and producing an output signal representing a desired clutch engagement force in accordance with the input signal, an output means for producing the control signal in accordance with the output signal of said function generating means, and a characteristic adjusting means for adjusting a characteristic relationship between the output and input signals of said function generating means in accordance with the vehicle speed so that the desired clutch engagement force is decreased when said vehicle speed increases;

wherein said function generating means includes a means for generating the output signal in accordance with the input signal so that the output signal is a monotone nondecreasing function of the input signal, and said characteristic adjusting means includes a means for adjusting said nondecreasing function so as to decrease a value of said output signal corresponding to a predetermined value of said input signal when said vehicle speed increases;

wherein said function generating means includes a means for generating the output signal in accordance with the input signal so that the output signal is increased linearly with increase in the input signal at a preset rate of increase until an upper limit is reached by the output signal, and said characteristic adjusting means includes a means for decreasing one of the rate of increase and the upper limit which are used by said function generating means when the vehicle speed increases;

wherein said input means includes a means for determining a normal left and right wheel speed difference which is a left and right wheel speed difference due to a difference between turning radii of inside and outside wheels during a turn of the vehicle; further determining a controlled wheel speed difference which is equal to zero when a sensed wheel speed difference sensed by said wheel speed difference sensing means is smaller than the normal wheel speed difference and which is equal to a difference from the sensed wheel speed difference when the senses wheel speed difference is greater than the normal wheel speed difference; and producing the input signal representing the controlled wheel speed difference;

wherein said sensor means further comprises a turning motion sensing means for determining a turning motion variable indicative of a turning motion of the vehicle, and said input means includes a means for determining a turning radius of the vehicle from the vehicle speed and the turning motion variable and determining the normal wheel speed difference which is proportional to a fraction whose numerator is the vehicle speed and whose denominator is the turning radius.

16. A control system according to claim 15 wherein said wheel speed difference sensing means comprises a left wheel rotation sensor for sensing the rotational speed of the left drive wheel and a right wheel rotation sensor for sensing the rotational speed of the right drive wheel, said vehicle speed sensing means comprises a vehicle speed sensor, and said turning motion sensing means comprises a lateral acceleration sensor for sensing a lateral acceleration of the vehicle, and wherein said input means includes a means for determining the turning radius which is set equal to a quotient obtained by dividing a second power of the vehicle speed by the lateral acceleration.

17. A control system according to claim 16 wherein said characteristic adjusting means includes a means for holding the upper limit of the clutch engagement force substantially equal to zero when said vehicle speed is higher than a predetermined value.

18. A control system according to claim 16 wherein said characteristic adjusting means includes a means for holding the rate of increase of the clutch engagement force equal to a predetermined highest rate value when the vehicle speed is lower than a predetermined first speed value, decreasing the rate of increase from the highest rate value to a predetermined lowest rate value as the vehicle speed increases from the first speed value to a second speed value higher than the first speed value, holding the rate of increase equal to the lowest rate value when the vehicle speed is higher than the second speed value.

19. A control system according to claim 18 wherein said characteristic adjusting means includes a means for holding the upper limit equal to a highest limit value when the vehicle speed is lower than a predetermined third speed value, decreasing the upper limit from the highest limit value to an intermediate limit value as the vehicle speed increases from the third speed value to a fourth speed value higher than the third speed value, holding the upper limit equal to the intermediate limit value when the vehicle speed is higher than the fourth speed value and lower than a fifth speed value higher than the fourth speed value, decreasing the upper limit from the intermediate limit value to a lowest limit value as the vehicle speed increases from the fifth speed value to a sixth speed value higher than the fifth speed value, and holding the upper limit equal to the lowest limit value when the vehicle speed is higher than the sixth speed value.

* * * * *